United States Patent [19]

Johns, Jr.

[11] 3,981,374

[45] Sept. 21, 1976

[54] HYDRAULIC DRIVE ASSIST FOR SCRAPERS

[75] Inventor: Robert C. Johns, Jr., Lubbock, Tex.

[73] Assignee: Clark Equipment Company, Buchanan, Mich.

[22] Filed: Nov. 13, 1974

[21] Appl. No.: 523,308

[52] U.S. Cl. .......................... 180/14 A; 180/44 M; 180/66 R; 60/468; 60/449

[51] Int. Cl.$^2$ .......................................... B62D 59/04

[58] Field of Search ............. 180/44 M, 44 F, 66 R, 180/14 R, 14 A, 54 C; 60/449, 464, 468, 494

[56] References Cited

UNITED STATES PATENTS

| | | | |
|---|---|---|---|
| 3,053,043 | 9/1962 | Knowler | 180/44 M |
| 3,135,087 | 6/1964 | Ebert | 60/464 |
| 3,293,942 | 12/1966 | Stein et al. | 180/14 A |
| 3,415,057 | 12/1968 | Rosenberg | 60/468 |
| 3,449,912 | 6/1969 | Dunikowski | 60/464 |
| 3,512,277 | 5/1970 | Stuller | 37/8 |
| 3,584,698 | 6/1971 | Larson | 180/14 A |
| 3,612,202 | 10/1971 | Moon, Jr. | 180/66 R |
| 3,803,843 | 4/1974 | Nyman | 60/449 |
| 3,841,423 | 10/1974 | Holtkamp | 180/66 R |
| 3,874,470 | 4/1975 | Greene | 180/44 M |

*Primary Examiner*—M. H. Wood, Jr.
*Assistant Examiner*—Jack D. Rubenstein
*Attorney, Agent, or Firm*—Kenneth C. Witt

[57] ABSTRACT

An hydraulic drive supplies power to the rear wheels of a scraper at loading speeds providing a pushing assist to the tractor engine powering the tractor wheels at the front. The drive includes a piston type motor mounted on the stinger or pusher frame of the scraper and connected through a short torque shaft to a drive axle driving the scraper wheels. A signal generator senses ground speed to maintain the motor freewheeling at speeds attainable by the tractor which would be destructive to the motor.

2 Claims, 2 Drawing Figures

HYDRAULIC DRIVE ASSIST FOR SCRAPERS

The invention herein described was made in the course of or under a contract with the Department of Defense.

BACKGROUND OF THE INVENTION

1. Field of the Invention

The invention pertains to the art of earth moving equipment and particularly to off-highway machines such as tractor scrapers.

2. Description of the Prior Art

Tractor scrapers will have a self-propelled tractor for towing a scraper. The scraper may have a separate engine mounted on the stinger or pusher frame at the rear for independently driving the scraper wheels. Such a twin engine drive for an elevating type scraper is, for example, disclosed in U.S. Pat. No. 3,512,277 issued May 19, 1971, to the assignee of the present invention. Twin engine scrapers are capable of developing more power than the single engine machines and consequently can often load more quickly in areas where soil penetration of the scraper blade is difficult as in hard clay. These machines are more complex, however, and need more maintenance than the single engine scrapers.

SUMMARY OF THE INVENTION

A twin drive for a tractor scraper is provided where the tractor engine powers a variable displacement piston pump which is hydraulically coupled to a piston motor mounted on the pusher frame. The output of the motor connects through a short torque shaft to a drive axle powering the scraper wheels.

The hydraulic drive unit is a closed hydrostatic loop system with high pressure fluid supplied in either direction of swash plate displacement from neutral for forward or reverse drive of the motor.

The motor is automatically shifted from zero displacement or freewheeling to maximum displacement when the swash plate of the pump is shifted in either direction for the forward or reverse drive mode.

To prevent overdrive and possible cavitation of the hydrostatic components because of the tractor engine's capacity for towing the scraper at higher speeds than are permissible for the hydrostatic units, a speed switch or governor limits the upper range at which the motor may be shifted from the freewheeling to drive mode.

A main advantage present in the hydrostatic drive is that a compact, auxiliary drive unit for tractor scrapers may be installed in the pusher frame of the scraper without extensive alterations or redesign of the scraper. The motor is mounted behind the scraper axle. It is connected by a short forwardly extending torque shaft to the input of a drive axle having planetary hubs poviding the necessary gear reduction to power the scraper wheels.

Another advantage seen as making the hydrostatic drive a practical drive unit is the provision of a governor or speed control which prevents the hydrostatic components from being overdriven by the tractor engine.

These and other advantages will be more apparent by referring to the following detailed description of the invention which proceeds with the description of the drawings wherein:

DESCRIPTION OF THE PREFERRED EMBODIMENTS

Figure 1:
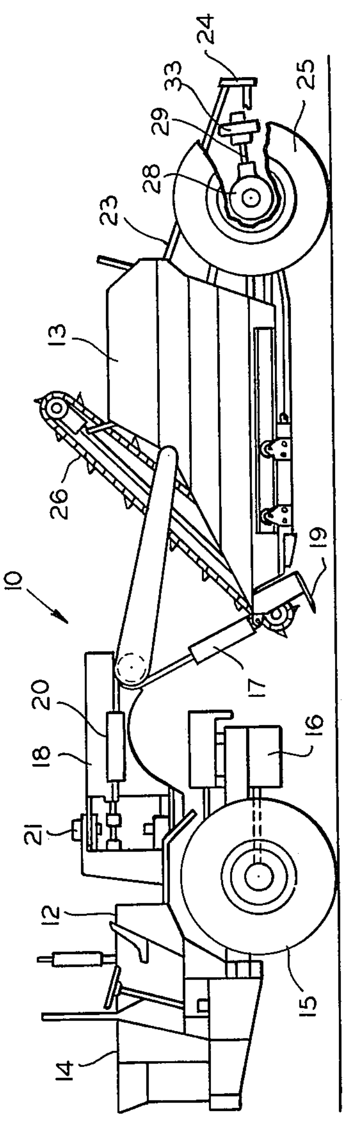
FIG. 1 is a side elevational view of a tractor scraper having an auxiliary hydrostatic drive in accordance with the invention.

FIG. 1 depicts a tractor scraper 10 having a tractor 12 towing a scraper 13. A tractor engine at 14 drives a pair of tractor wheels 15 through a transfer case and driveline indicated generally at 16. The scraper 13 is supported at the front by a yoke 18 having hydraulic cylinders 17, one on each side which may be extended to lower the front of the scraper and bring the scraper blade 19 into digging engagement with the ground. A pair of steering cylinders 20, one on each side of the yoke 18, pivot the tractor relative to the scraper about a vertical turning axis 21. A pusher frame 23 extends to the rear of the scraper 13 which has a pusher plate 24 which another piece of equipment, such as a dozer, will use at times to provide a pushing assist for the tractor. The scraper 13 is depicted with an elevator 26 at the front which aids in loading the scraper, however, it should be appreciated that the invention is equally applicable to conventional scrapers which will not have an elevator, but will have an apron pivoted at the front of the bowl for holding the dirt material which is pushed up by the blade while digging.

In either type of scraper, conditions often arise where the power supplied by the tractor, even with the loading assist from an elevator, is not sufficient at the depth of cut being made or consistent with efficienies sought to be obtained with the machine to reach acceptable loadings. In these situations the twin engine scraper, such as described in the aforementioned patent, has a definite advantage over a single engine scraper. With the scraper wheels powered by the rear engine and pushing the scraper from the rear, there is a doubling of the total tractive effort which can be obtained.

The present auxiliary hydrostatic drive unit powers a drive axle 28 driving the scraper wheels 25 through a torque shaft 29. It is powered by the engine 14 of the tractor and thus is not the equivalent of a twin engine scraper for power; however, the total power of the tractor engine in terms of rim pull is distributed between the scraper and tractor wheels. This is the important factor. The tractive effort is thus increased to nearly optimum conditions consistent with the usable output torque of the engine during loading operation.

Figure 2:
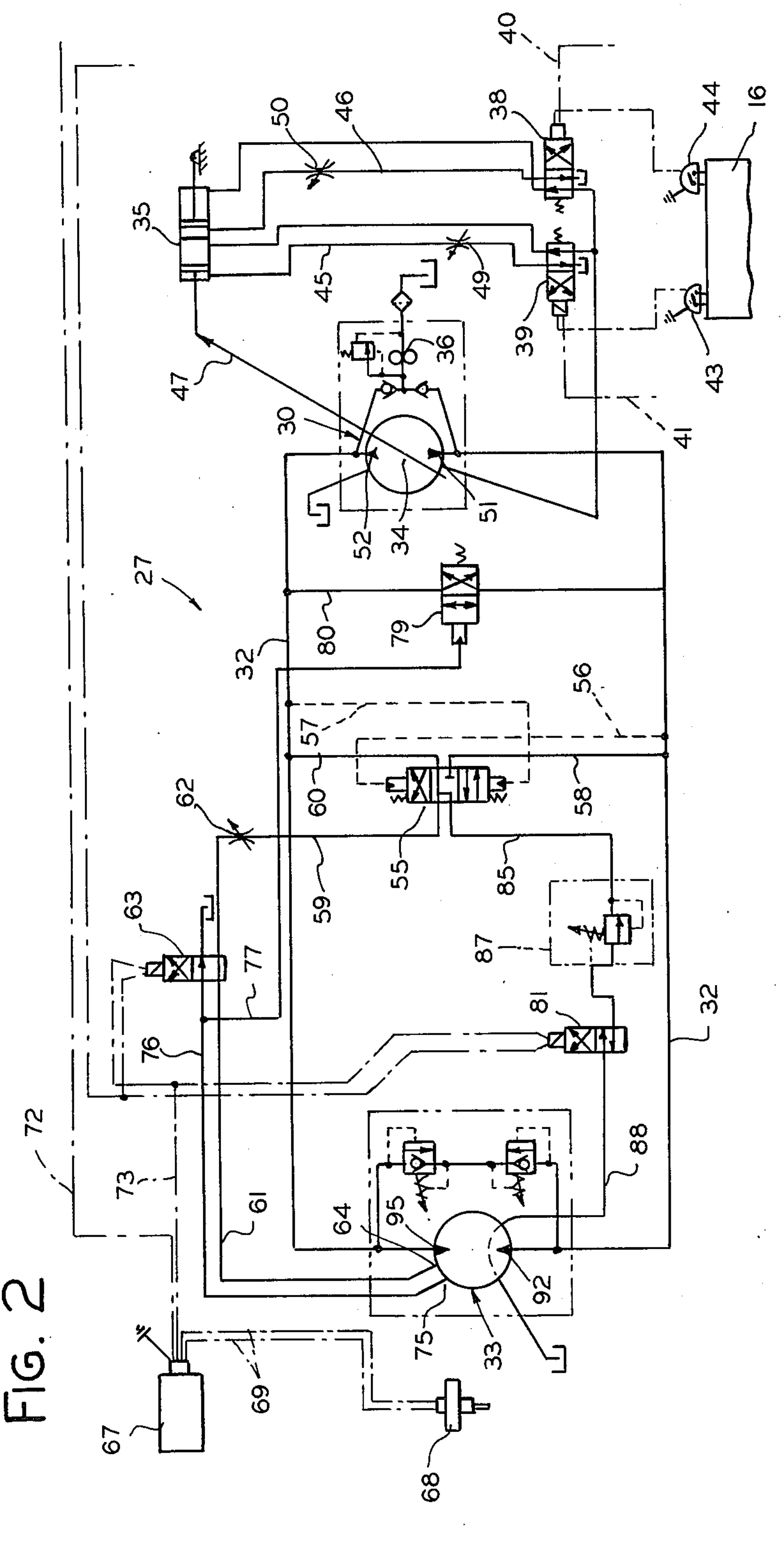
FIG. 2 is a circuit diagram of the hydrostatic drive.

Referring now to FIG. 2, the hydrostatic drive 27 includes a variable displacement, swash plate type piston pump 30 hydraulically coupled in a closed hydraulic loop 32 with a piston motor 33. The motor 33 is mounted behind the axle 28 in the pusher frame 23. The pump 30 is driven by the tractor engine. It can be mounted on the front of the scraper with a flexible drive line off of the tractor PTO used to drive it, or it may be mounted on the tractor and be driven from the transfer case 16. A swash plate 34 is capable of being positioned at maximum displacement in either direction from a neutral or zero displacement condition by means of an actuator 35 for either forward or reverse drive. When the pump swash plate is at neutral, and the tractor is running, a charge pump 36 maintains a low loop pressure through the loop line 32. This supplies the motor 33 with fluid for lubrication and cooling and allows it to be shifted as described hereinafter.

The actuator 35 is controlled by a pair of four-way, solenoid operated valves 38 and 39 energized through an electrical hookup 40, 41 with the tractor ignition. Pressure switches 43, 44 are operative when the tractor transmission is in either first forward or first reverse gear, respectively, thus energizing the solenoid of either valve 38 or 39. This will cause hydraulic fluid to be supplied to the actuator 35 through either lines 45 or 46 causing it to move a linkage 47 stroking the swash plate 34 to the full displacement position in either the forward or reverse directions. Flow restrictors 49 and 50 in the lines 45, 46 between the actuator 35 and solenoid operated valves control the rate at which the pump engages into the drive mode. When the pump swash plate 34 is moved to the maximum displacement position, this pressurizes one side or the other of the closed loop 32 connecting the motor 33 to a source of high pressure oil delivered to one side or the other of the loop from the output ports 51, 52 of the pump. A pilot operated fourway valve 55 is operated by pilot pressure in lines 56 or 57 in either a forward or reverse drive mode to shift the valve 55 causing high pressure fluid to be sent through lines 58 and 59 in the forward drive mode or lines 60 and 59 for the reverse drive mode. This pressurized fluid passes through a flow restrictor 62 in the line 59 to a solenoid operated valve 63 and then in line 61 to a port 64 on the motor 33 shifting it from the neutral or freewheeling position into the drive mode. The flow restrictor 62 controls the rate at which the shifting of the motor occurs.

The solenoid of the valve 63 is controlled by a governor or speed switch 67 actuated by a signal generator 68 driven by the shaft of the motor 33. The signal generator is driven at a speed proportional to the ground speed of the scraper wheels 25. If that speed exceeds that at which the mtoor can safely operate without damage, then the signal generator delivers a signal through the electrical lines 69 to the switch 67 causing actuation of the solenoid valve 63. At the instant the valve 63 is operated, line 59 is connected to the line 76 delivering fluid to port 75 for returning the motor to freewheeling. This pressurizes a pilot line 77 operating a valve 79. This valve makes a short loop circuit 80 across the closed loop circuit 32 and since the motor 33 is not a flow through type motor when it is shifted into freewheeling, the valve 79 prevents a high pressure closed circuit in the freewheeling mode. At the same time the valve 63 is shifted, another solenoid operated valve 81 is energized as well as valve 55 being shifted by the interruption of pilot pressure in lines 56 and 57. Valve 55 then allows charging oil pressure delivered through the lines 58, 60 from the pump to flow to port 75 for shifting and into line 85 and through a relief valve 87 and the solenoid operated valve 81 to a line 88 connected with the motor which supplies oil for lubrication and cooling in the freewheeling mode.

In operation, when the pump swash plate 34 is in neutral and the tractor is running, the motor is freewheeling and the charge pump 36 maintains a low loop pressure to port 75 and to line 88. This allows the motor 33 to have oil for lubrication and cooling plus allows the motor to be shifted. If the speed switch 67 is not overriding the pressure switches, 43, 44 actuation of either of the switches 43 or 44 will cause the swash plate of the pump to be stroked in either direction from neutral pressurizing one side or the other of the closed loop line 32. Assuming the forward gear of the transmission is engaged, the pressure switch 43 is closed actuating the valve 39. Hydraulic fluid flows through the line 45, flow restrictor 49 to one side of the actuator 35 stroking the pump swash plate to the forward mode. The high pressure output from the pump port 51 pressurizes the side of the loop 32 connected with the motor input port 92. At the same time, pilot pressure through line 56 actuates the valve 55 causing pressure to be delivered through line 58, 59, restrictor 62, valve 63, line 61 and to port 64 on the motor putting it into the drive mode. If the transmission is shifted in reverse, the pressure switch 44 is actuated causing the actuator to move in the opposite direction pressurizing the port 52 of the pump output and the side of the loop 32 connected with the motor input 95 propelling the motor in reverse. Pilot pressure in line 57 will shift valve 55 in the opposite direction which will supply pressure in line 60 to line 59 and then to port 64 also shifting the motor for the drive mode.

The motor will be shifted into the freewheeling mode either by the speed switch 67 or by shifting the transmission out of first forward or reverse gears de-energizing either of the pressure switches 43 or 44. In either case, high pressure is interrupted to vavle 55 through either lines 56 or 57 causing valve 55 to connect low charging pressure fluid only from lines 58, 60 to lines 59, 85. Valve 63 is actuated by the speed switch through electrical connections 72, 73 with the tractor ignition connecting line 59 with the line 76 and port 75 on the motor returning or maintaining it in the freewheeling mode regardless of the condition of the pressure switches 43 and 44. At the same time the valve 63 is shifted, the valve 79 is actuated relieving the high loop pressure by creating a short circuit loop 80 across the high pressure loop 32. Under this condition, low pressure continues to be supplied both for lubrication and cooling of the motor through the valve 81 and line 88 and through valve 55 to the motor for shifting into the freewheeling mode.

While one preferred embodiment of my invention has been disclosed it will be understood that the description is for purposes of illustration only and that various modifications and changes may be made without departing from the nature of the invention which is defined in the appended claims.

I claim:

1. A hydraulic drive for a ground vehicle having wheels propelled by an engine and other wheels driven by the hydraulic drive during predetermined conditions for assisting the engine propelled wheels, comprising a variable displacement pump driven by the engine, a hydraulic motor connected to said pump in a closed loop hydraulic circuit, said pump having means displaceable in either direction from a neutral position for pressurizing the pump and driving said motor selectively in either forward or reverse drive mode, a normally closed pilot operated by-pass valve connected between the sides of said closed loop circuit to form a short loop circuit by-passing the motor when said by-pass valve is open, a second pilot operated valve actuated by the operating pressure in said closed loop hydraulic circuit downstream from said short loop circuit, said second pilot operated valve connected for operation by a pressure differential between the opposite sides of said closed loop circuit for putting the motor in the drive mode for either forward or reverse operation, a speed sensor driven at a speed proportional to the ground speed of the hydraulically driven wheels, means responsive to the indication of a predetermined speed by said speed sensor for operating said normally closed by-pass valve to open it, and a charging pump connected to said closed loop circuit for providing fluid for lubrication and cooling of the motor and for operation of said second pilot operated valve when said variable displacement pump is in said neutral position.

2. A hydraulic drive as in claim 1 wherein said means responsive to said speed sensor includes a speed switch, a solenoid operated valve operatively connected to said speed switch, and a hydraulic circuit supplied by said second pilot operated valve for hydraulic pilot operation of said first pilot operated valve.

* * * * *